(12) United States Patent
Mitchell et al.

(10) Patent No.: US 7,251,379 B2
(45) Date of Patent: Jul. 31, 2007

(54) DISTRIBUTED VECTOR PROCESSING OF THE S TRANSFORM FOR MEDICAL APPLICATIONS

(75) Inventors: J. Ross Mitchell, Calgary (CA); T. Chen Fong, Calgary (CA); Robert Brown, Spirit River (CA); Hongmei Zhu, Calgary (CA)

(73) Assignee: 976076 Alberta Inc., Calgary, Alberta (CA)

( * ) Notice: Subject to any disclaimer, the term of this patent is extended or adjusted under 35 U.S.C. 154(b) by 993 days.

(21) Appl. No.: 10/430,294

(22) Filed: May 7, 2003

(65) Prior Publication Data

US 2003/0212491 A1 Nov. 13, 2003

Related U.S. Application Data

(60) Provisional application No. 60/378,934, filed on May 10, 2002.

(51) Int. Cl.
G06K 9/54 (2006.01)
(52) U.S. Cl. .................................................. 382/304
(58) Field of Classification Search ............... 382/304, 382/276
See application file for complete search history.

(56) References Cited

U.S. PATENT DOCUMENTS

| 6,850,062 B2 * | 2/2005 | Mitchell et al. ............ 324/307 |
| 2003/0210047 A1 * | 11/2003 | Mitchell et al. ............ 324/309 |
| 2005/0253863 A1 * | 11/2005 | Mitchell et al. ............ 345/582 |
| 2007/0027657 A1 * | 2/2007 | Pinnegar et al. ............ 702/189 |

OTHER PUBLICATIONS

Normile et al.; "A parallel processing approach to transform based image coding", SPIE vol. 1452 Image Processing Algorithms and Techniques II, 1991.*
Gibson et al.; "Letter to the Editor: Stockwell and Wavelet Transforms", The Jornal of Fourier Analysis and Applications, vol. 12 Issue 6, 2006.*
Mansinha et al.; "Pattern Analysis with Two Dimensional Spectral Localisation: Applications of 2 Dimensional S Transforms", Physica A, 239, p. 286-295, 1997.*
Feil et al.; "Computation of the continuous wavelet transform on massively parallel SMID arrays", Parallel Processing Letters, 1999.*

(Continued)

Primary Examiner—Bhavesh M Mehta
(74) Attorney, Agent, or Firm—Freedman & Associates

(57) ABSTRACT

The present invention relates to a method and system for distributed computing an S transform dataset of multidimensional image data of an object. The multidimensional image data are fast Fourier transformed into Fourier domain producing a Fourier spectrum. The respective Fourier frequencies are then partitioned into a plurality of portions of frequencies for simultaneously processing. Processing of each of the plurality of portions of the Fourier frequencies is assigned to a respective processor of a plurality of processors. The Fourier spectrum of multidimensional image data and each of the plurality of portions of the Fourier frequencies is transmitted to the respective processor. The portions of the Fourier frequencies are then simultaneously processed in order to produce the S transform dataset. The S transform data are then collected and stored. The method and system for computing the S transform according to the invention provides a substantially increased computation speed enabling use of the S transform for practical applications in a clinical setting.

26 Claims, 7 Drawing Sheets

OTHER PUBLICATIONS

Mansinha et al., "Local S-spectrum Analysis of 1-D and 2-D Data", Physics of the Earth and Planetary Interiors, Elsevier Science B.V., No. 103, pp. 329-336, 1997.

Stockwell et al., "Localization of the Complex Spectrum: The S Transform", IEEE Transactions on Signal Processing, IEEE, vol. 44, No. 4, Apr. 1996.

* cited by examiner

DISTRIBUTED VECTOR PROCESSING OF THE S TRANSFORM FOR MEDICAL APPLICATIONS

This application claims benefit from U.S. Provisional Application No. 60/378,934 filed May 10, 2002.

FIELD OF THE INVENTION

This invention relates to signal processing based on the S transform and in particular to a signal processing method and system based on distributed vector processing of the S transform for medical applications.

BACKGROUND OF THE INVENTION

The Fourier transform of a function $f(t)$ has served as the most important transform in numerous signal processing applications. For example, the Fourier transform is widely used in imaging analysis such as CT and Magnetic Resonance Imaging (MRI).

Standard Fourier analysis reveals individual frequency components involved in a signal or image. However, in many situations of frequencies changing over time or space the standard Fourier analysis does not provide sufficient information. In numerous applications processing of non-stationary signals or images reveals important information. For example, in MRI signal processing motion caused by respiratory activity, cardiac activity, blood flow causes temporal changes in spatial frequencies.

To overcome the deficiency of the standard Fourier analysis, other techniques such as the Gabor transform (GT) disclosed in: Gabor, D. "Theory of communications", J. Inst. Elec. Eng., 1946; 93, 429-457, also known as the short time Fourier transform, and the Wavelet transform (WT) disclosed in: Goupillaud P., Grossmann, A., Morlet J. "Cycle-octave and related transforms in seismic signal analysis", Geoexplor, 1984; 23, 85-102,and in: Grossmann, A., Morlet J. "Decomposition of Hardy functions into square integrable Wavelets of constant shape", SIAM J. Math. Anal.,1984; 15, 723-736,have been developed, references to which are incorporated herein by reference. Both of these methods unfold the time information by localizing the signal in time and calculating its "instantaneous frequencies." However, both the GT and the WT have limitations substantially reducing their usefulness in the analysis of imaging signal data. The GT has a constant resolution over the entire time-frequency domain which limits the detection of relatively small frequency changes. The WT has variant resolutions, but it provides time vs. scale information as opposed to time vs. frequency information. Although "scale" is loosely related to "frequency"—low scale corresponds to high frequency and high scale to low frequency—for most wavelets there is no explicit relationship between scale factors and the Fourier frequencies. Therefore, the time-scale representation of a signal is difficult if not impossible to interpret.

The Stockwell transform (ST) disclosed in: Stockwell R. G., Mansinha L., Lowe R. P., "Localization of the complex spectrum: the S-transform", IEEE Trans. Signal Process, 1996; 44, 998-1001,references to which are incorporated herein by reference, is a spectral localization transform that utilizes a frequency adapted Gaussian window to achieve optimum resolution at each frequency.

While the standard Fourier transform provides information about the frequency content of an entire signal or image the ST provides a local spectrum for each point of the signal or image. Therefore, the ST provides information about changes in frequency content over time or space. The 1D ST applied to signal data such as time course fMRI data is used to localize and remove noise components and artifacts. The 2D ST provides local textural information for each point in an image. This information is useful in distinguishing between tissues of differing appearance. For example, a texture map of an MR image enhances differences indicating lesions or other abnormalities due to disease activity that are difficult to distinguish in conventional MR images.

However, the ST of a 2D image function $I(x, y)$ retains spectral variables $k_x$ and $k_y$ as well as spatial variables x and y, resulting in a complex-valued function of four variables. Therefore, calculation of the S transform of multidimensional signal data is computationally intensive. Unfortunately, the processing time needed for transforming a typical multidimensional MR image is preventing the S transform from numerous practical applications in a clinical setting.

SUMMARY OF THE INVENTION

It is, therefore, an object of the invention to substantially reduce the time needed to calculate the S transform by providing a signal processing method and system based on distributed vector processing of the S transform.

It is further an object of the invention to provide a signal processing method and system based on distributed vector processing of the S transform allowing application of the S transform in a clinical setting.

The method and system for computing the S transform according to the invention provides a substantially increased computation speed enabling use of the S transform for practical applications in a clinical setting. This is accomplished, firstly, by taking maximum advantage of the hardware on which it is executing and, secondly, by applying distributed processing methods and combinations thereof.

In accordance with the present invention there is provided a method for computing an S transform dataset of multidimensional image data of an object comprising the steps of:
receiving the multidimensional image data;
fast Fourier transforming the multidimensional image data into Fourier domain producing a Fourier spectrum;
partitioning Fourier frequencies of the multidimensional image data into a plurality of portions of frequencies for simultaneously processing an S spectrum corresponding to the portions of the Fourier frequencies;
using a parallel vector processor simultaneously processing the S spectrum corresponding to the portions of the Fourier frequencies by dividing a vector into a plurality of segments, each segment for processing the S spectrum corresponding to a portion of the Fourier frequencies, the portions being processed by performing at each frequency of a plurality of frequencies of the Fourier spectrum the steps of:
  a) calculating a localizing Gaussian window at a current frequency;
  b) shifting the Fourier spectrum in k space directions;
  c) pointwise matrix multiplying the shifted Fourier spectrum with the localized Gaussian window producing a resulting L matrix;
  d) inverse fast Fourier transforming the L matrix producing the S spectrum at the current frequency; and,
collecting the S spectrum at each frequency producing the S transform dataset, the S transform dataset for being processed to extract features relating to a physical occurrence within the object therefrom.

In accordance with the present invention there is further provided a method for computing an S transform dataset of multidimensional image data of an object comprising the steps of:

receiving the multidimensional image data;

fast Fourier transforming the multidimensional image data into Fourier domain producing a Fourier spectrum;

partitioning Fourier frequencies of the multidimensional image data into a plurality of portions of frequencies for simultaneously processing an S spectrum corresponding to the portions of the Fourier frequencies;

assigning processing of the S spectrum corresponding to each of the plurality of portions of the Fourier frequencies to a respective processor of a plurality of processors;

transmitting the Fourier spectrum and each of the plurality of portions of the Fourier frequencies to the respective processor;

simultaneously processing the S spectrum corresponding to each of the plurality of portions of the Fourier frequencies by performing on the respective processor at each frequency of a plurality of frequencies of the portion of the Fourier spectrum the steps of:

a) calculating a localizing Gaussian window at a current frequency;

b) shifting the Fourier spectrum in k space directions;

c) pointwise matrix multiplying the shifted Fourier spectrum with the localized Gaussian window producing a resulting L matrix;

d) inverse fast Fourier transforming the L matrix producing the S spectrum at the current frequency; and, collecting the S spectrum at each frequency producing the S transform dataset, the S transform dataset for being processed to extract features relating to a physical occurrence within the object therefrom.

In accordance with the present invention there is further provided a method for distributed computing an S transform dataset of multidimensional image data of an object comprising the steps of:

using a first workstation of a cluster of workstations receiving the multidimensional image data;

using the first workstation fast Fourier transforming the multidimensional image data into Fourier domain producing a Fourier spectrum;

using the first workstation partitioning Fourier frequencies of the multidimensional image data into a plurality of portions of frequencies for distributing processing of an S spectrum onto the workstations of the cluster;

assigning processing of the S spectrum corresponding to each of the plurality of portions of the Fourier frequencies to a respective workstation of the cluster;

transmitting the Fourier spectrum and each of the plurality of portions of the Fourier frequencies to the respective workstation of the cluster;

processing each of the plurality of portions of the Fourier frequencies on the respective workstation by performing the steps of:

a) calculating a localizing Gaussian window at a current frequency;

b) shifting the Fourier spectrum in k space directions;

c) pointwise matrix multiplying the shifted Fourier spectrum with the localized Gaussian window producing a resulting L matrix;

d) inverse fast Fourier transforming the L matrix producing the S spectrum at the current frequency;

transmitting the S spectrum at the current frequency from each respective workstation to a data collecting workstation of the cluster;

using the data collecting workstation assembling the S transform dataset based on the collected S transform data, the S transform dataset for being processed to extract features relating to a physical occurrence within the object therefrom.

In accordance with the present invention there is yet further provided a processing system for computing an S transform dataset of multidimensional image data of an object comprising:

at least a processor for performing at each frequency of a plurality of frequencies of a Fourier spectrum of the multidimensional image data the steps of:

a) calculating a localizing Gaussian window at a current frequency;

b) shifting the Fourier spectrum in k space directions;

c) pointwise matrix multiplying the shifted Fourier spectrum with the localized Gaussian window producing a resulting L matrix;

d) inverse fast Fourier transforming the L matrix producing S transform data at the current frequency;

at least a memory for data storage;

a display for displaying a multidimensional image of the object, the image being based upon the S transform data; and, a communication link connecting the at least a processor, the at least a memory, and the display for providing data communication therebetween.

BRIEF DESCRIPTION OF THE FIGURES

Exemplary embodiments of the invention will now be described in conjunction with the following drawings, in which.

DETAILED DESCRIPTION OF THE INVENTION

Figure 1:
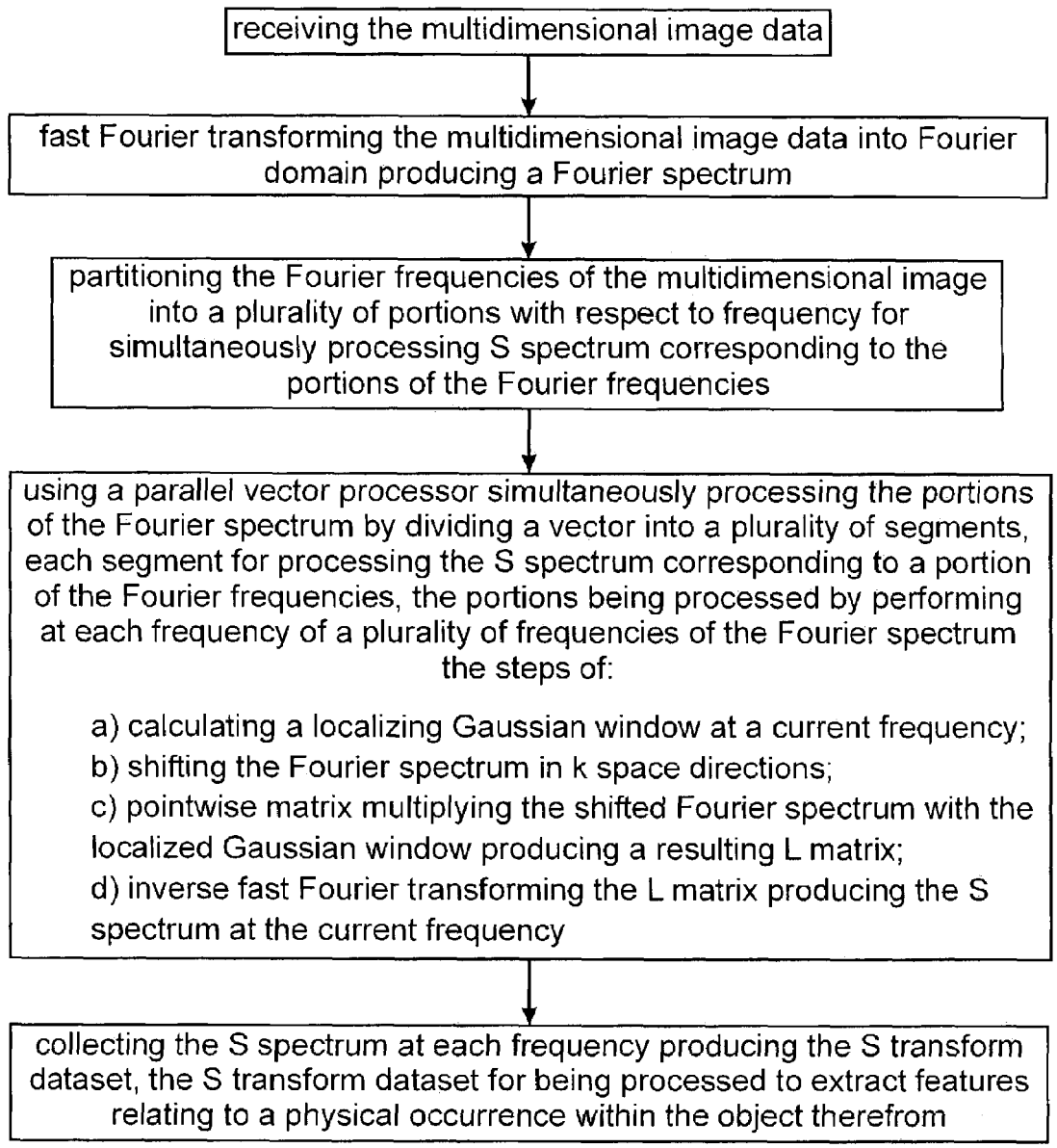
FIG. 1 is a flow diagram illustrating a first embodiment of a method for computing an S transform dataset of multidimensional image data according to the invention.

Hereinbelow, the distributed vector processing of the S transform is presented illustrating the processing of 2D image data. It is evident to those of skill in the art based on the explanation below that the distributed vector processing of the S transform according to the invention is not limited thereto but is also applicable for the processing of a wide range of multi-dimensional data, for example, video data or multidimensional environmental data.

Using the Fourier convolution theorem, the S transform of an image I(x, y) is defined by:

$$S(x, y, k_x, k_y) = \int_{-\infty}^{+\infty}\int_{-\infty}^{+\infty} H(\alpha + k_x, \beta + k_y) G(\alpha, \beta; k_x, k_y) d\alpha\, d\beta,$$

where $H(k_x, k_y)$ is the Fourier transform of the image function I(x, y) and $G(\alpha, \beta; k_x, k_y)$ is a frequency adapted Gaussian window. The above formulation of the ST allows use of the Fast Fourier Transform (FFT) for more efficient computation.

The computation of the S transform is then implemented based on the following steps:

Step 1. Fast Fourier transforming the image function I(x, y) as follows: $H(\alpha, \beta)=FFT(I(x, y))$; for each frequency $(k_x, k_y)$ where $k_x, k_y \neq 0$ performing the following steps 2 to 5;

Step 2. calculating a localizing 2D Gaussian window at the current frequency $(k_x, k_y)$:

$$G(\alpha, \beta; k_x, k_y) = e^{-\frac{2\pi\alpha^2}{k_x^2}} \cdot e^{-\frac{2\pi\beta^2}{k_y^2}};$$

Step 3. shifting the Fourier spectrum $H(\alpha, \beta)$ to $H(\alpha+k_x, \beta+k_y)$;

Step 4. computing $L(\alpha, \beta; k_x, k_y)=H(\alpha+k_x, \beta+k_y)\cdot G(\alpha, \beta; k_x, k_y)$, where "." indicates pointwise matrix multiplication;

Step 5. inverse fast Fourier transforming $L(\alpha, \beta; k_x, k_y)$ from the $\alpha$-$\beta$ plane into the x-y plane giving the two dimensional S transform $S(*, *, k_x, k_y)$ at the current frequency $(k_x, k_y)$. $S(*, *, k_x, k_y)$ provides the spatial information of the occurrence of the frequency $(k_x, k_y)$.

In the above loop of steps 2 to 5, three basic computational tasks are performed:

a shift of $H(\alpha, \beta)$ to $H(\alpha+k_x, \beta+k_y)$;

a pointwise matrix multiplication $H(\alpha+k_x, \beta+k_y)\cdot G(\alpha, \beta; k_x, k_y)$; and, an inverse Fourier transform.

For a N by N image I(x, y), these tasks are O(c) operations—accomplished with pointer operations—, $O(N^2)$ operations, and $O\lfloor N^2 \log(N)\rfloor$ operations, respectively. Of these tasks, the inverse Fourier transform is of the highest order. Since steps 2 to 5 are repeated for each frequency $(k_x, k_y)$, $N^2$ inverse Fourier transforms have to be performed yielding an overall computational complexity for the 2D ST of $O\lfloor N^4 \log(N)\rfloor$.

The ST of a 2D image function I(x, y) retains the spectral variables $k_x$ and $k_y$ as well as the spatial variables x and y, resulting in a complex-valued function of four variables, i.e. a four dimensional. Therefore, the storage space needed for storing the ST of a 2D image is $O(N^4)$. For example, a 256×256 pixel image at eight bits per pixel requires 64 KB to store—over twenty images fit on an ordinary floppy disk. In comparison, the ST of the same image requires $256^2$ more storage space—4 GB or approximately six compact disks. Actually, as the ST is generally performed using complex floating point data this requirement is multiplied by a factor of up to 8. These memory requirements pose substantial problems not only for long-term storage but also for the execution of the S transform. Few computers possess enough RAM to perform the ST for larger images without swapping data to a hard disk—an inherently slow process.

In order to enable use of the S transform for practical applications in a clinical setting, the present invention discloses a method and system for computing the S transform—and in particular for computing steps 2 to 5 of the above process—having a substantially increased computation speed. In a first approach, the above process is tuned to take maximum advantage of the hardware on which it is executing. Further, an iteration with respect to a frequency $(k_x, k_y)$ in the loop comprising steps 2 to 5 is fully independent, i.e. the current iteration does not need any results from a previous iteration. Therefore, each S spectrum $S(*, *, k_x, k_y)$ at a current frequency $(k_x, k_y)$ is calculated with only the FFT of the original image data as input. This allows computation of the steps 2 to 5 using parallel and/or distributed processing.

As is evident, efficient implementation of a process such as the S transform shown above is not a trivial task. Different programming languages have strengths and weaknesses and details of implementation often differ on the language used. In a first step the above ST process has been implemented using IDL as basis for comparing other implementations written in C. IDL is a high level language facilitating implementation compared to code written in C. However, the ease of implementation is at the cost of a corresponding opacity in the computation often resulting in inefficiencies.

An ST process implemented in IDL utilizing a built in IDL FFT function is used as a reference. The FFT of a 256×256 image takes approximately 0.075 seconds on a Mac G4 867 using RSI IDL 5.4. Based on this information, an S transform of the same data—requiring $256^2$ FFTs—is expected to take approximately 1.5 hours. The ST of a 512×512 image is expected to take about 36 hours. Implementation of the ST using IDL introduces significant inefficiencies. For example in step 3, the Fourier spectrum—a two dimensional N by N structure—is shifted in both the $k_x$ and $k_y$ directions. In the above analysis, this step has been asserted O(c) because it is possible to accomplish it in constant time, regardless of N. In the IDL implementation a very convenient shift( ) function is utilized in the computation of step 3. Unfortunately, the computing time for the IDL shift( ) function is approximately proportional $O(N^2)$. Since in the ST process a large number of shifts are performed, the shift function is substantially more efficiently implemented generating and storing, for example in the case of a 2D image, four copies of the Fourier spectrum and using pointer operations. Since in present computer technology all data are stored using 1D arrays "strides" are implemented for performing the pointer operations. The stride indicates the number of positions to be advanced in the 1D array to find a subsequent element along a given axis of a respective multi-dimensional data set. Employment of this technique obviates the need of moving every data point to a new position for performing the shift function, therefore, substantially reducing computing time at the cost of a small amount of additional memory used. Similarly, several of the Gaussian window calculations are redundant allowing storage of a set of pre calculated vectors, which are then combined to create a Gaussian window as needed during the iteration.

Another opportunity for reducing computing time is the use of Motorola's Altivec co-processor included in the Macintosh G4 processor. The Altivec co-processor is a powerful parallel vector processor for accelerating multimedia and signal processing tasks. The Altivec co-processor performs operations on a 128 bit vector allowing flexible division into several elements. Using a floating point data type the Altivec co-processor is capable of performing an operation on four values simultaneously. As well, common signal processing operations have been optimized for the Altivec co-processor.

Figure 2:
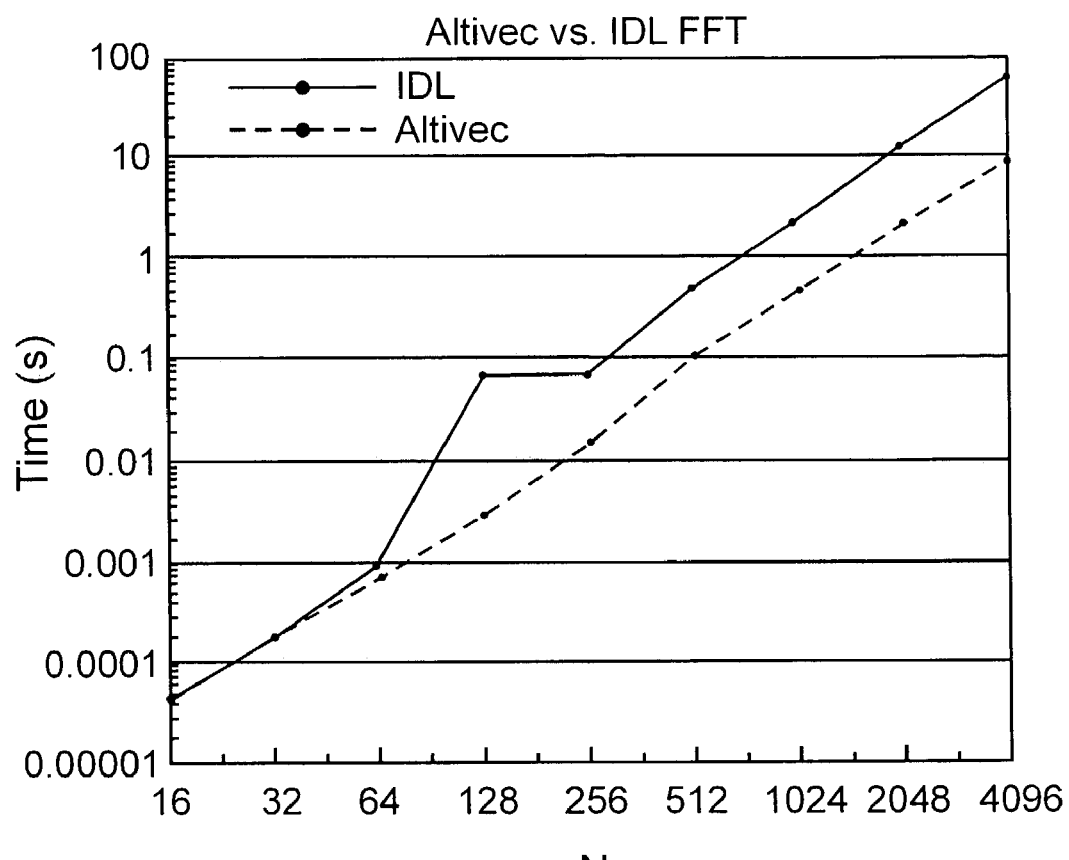
FIG. 2 is a diagram comparing the performance of Altivec optimized FFT with the performance of IDL FFT.

In a ST processing method according to the invention, a FFT library optimized for the Altivec co-processor has been adapted for optimally performing multiple successive FFTs for computing a ST of an image as shown in the flow diagram of FIG. 1. FIG. 2 illustrates a comparison of the computing time for performing a FFT in the ST process using IDL FFT with the Altivec optimized implementation. The Altivec optimized FFT is significantly faster than the IDL implementation with increasing difference for larger data sets. For example, for a 256×256 image, the Altivec implementation is approximately five times faster.

Although optimization for a given hardware platform provides significant improvement in computing time, those improvements are ultimately limited. Further significant reduction of computing time is achieved by exploiting the potential for independent calculation of each iteration step respective to a $S(*, *, k_x, k_y)$ plane according to the invention. Each $S(*, *, k_x, k_y)$ plane is calculated with no dependence on the other $S(*, *, k_x, k_y)$ planes, therefore, allowing parallel execution on different processors.

Figure 3:
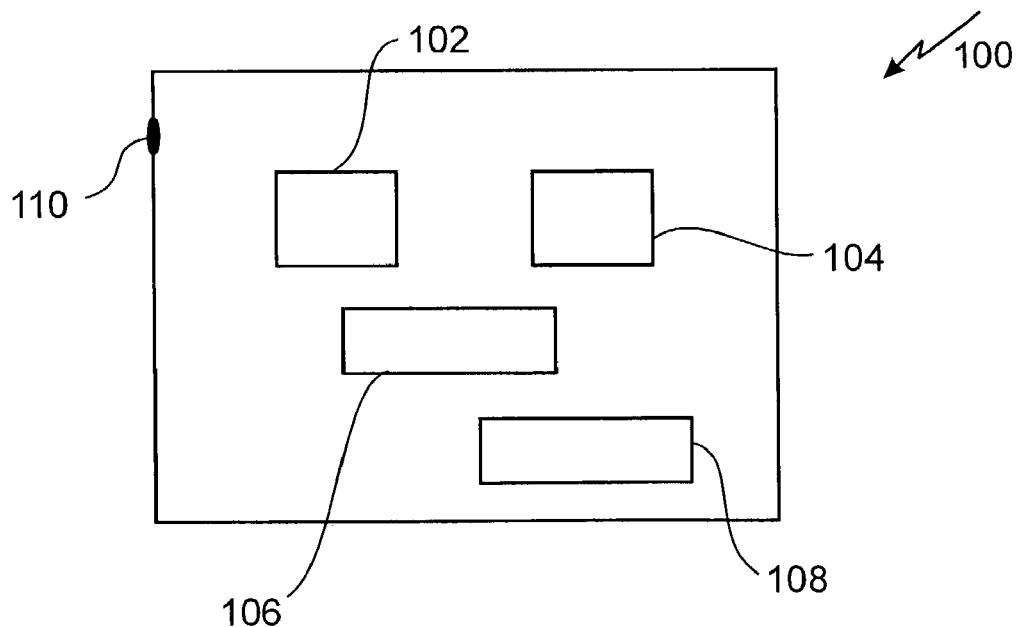
FIG. 3 is a simplified diagram illustrating an embodiment of a system for distributed computing an S transform dataset of multidimensional image data according to the invention.
Figure 4:
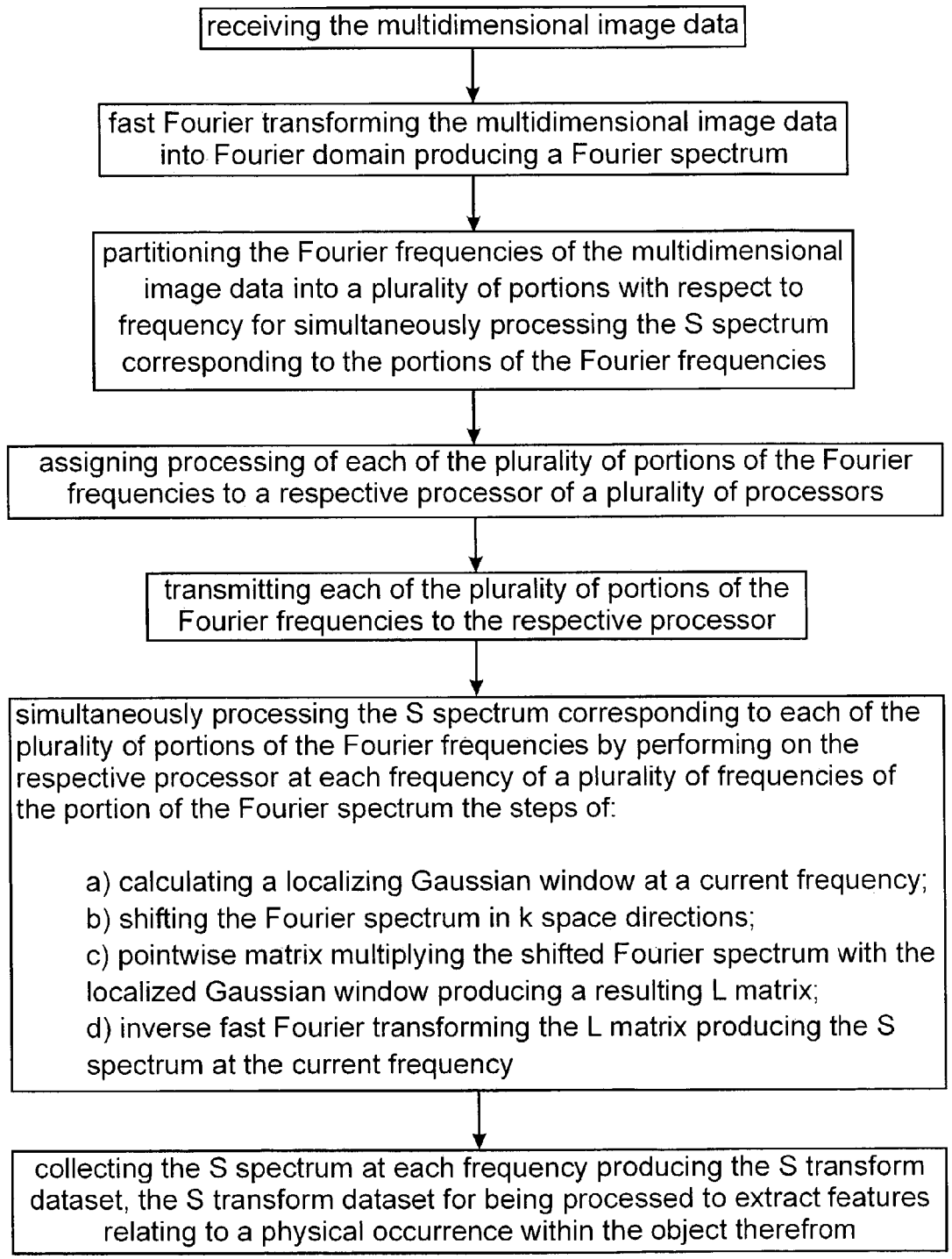
FIG. 4 is a flow diagram illustrating an embodiment of a method for distributed computing an S transform dataset of multidimensional image data according to the invention.

Referring to FIGS. 3 and 4, a system and method for ST processing according to the invention is shown. Here, the parallel computation is achieved using a multiprocessor computer 100. The multiprocessor computer comprises, for example, 2 processors 102 and 104 sharing resources such as memory 106 and disk drives 108. Further, the multiprocessor computer comprises a communication port 110 for receiving, for example, multidimensional data such as imaging data from an MRI system. Alternatively, the multidimensional data are provided using a portable storage medium such as a floppy disk or compact disk. After processing the ST data are, for example, provided for storage in a database, not shown. In multiprocessor computers, such as the multiprocessor computer 100, the processors 102 and 104 share resources such as memory 106 and disk drives 108 but are capable of independent operation. In a dual processor computer, as shown in FIG. 3, it is possible to assign half of the calculations of the ST process to each of the processors 102 and 104. Computation is then executed in parallel, theoretically dividing the computation time approximately in half, plus some overhead for setting up the calculation. However, as noted earlier the ST process has significant memory requirements. Since all the processors in a multiprocessor computer share memory, they are generally not capable of reading or writing to the same memory simultaneously. A significant part of the ST calculation involves communication and storage of results, thus limiting the performance increase gained by using a multiprocessor computer with shared resources.

Figure 5:
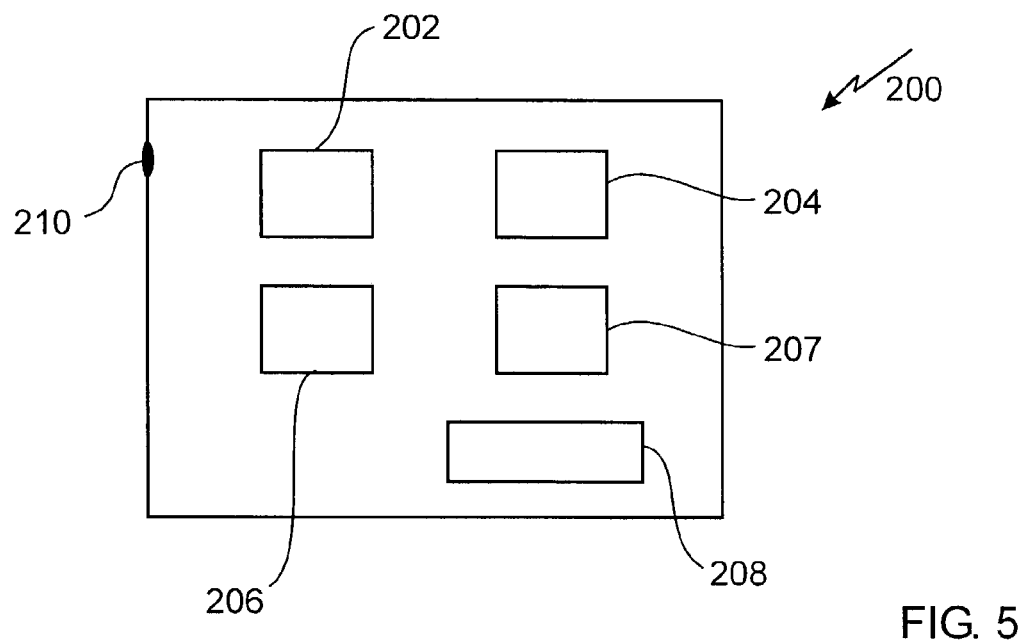
FIG. 5 is a simplified diagram illustrating another embodiment of a system for distributed computing an S transform dataset of multidimensional image data according to the invention.

This limitation is overcome using a multiprocessor computer 200 as shown in FIG. 5 for the ST computation according to the invention. Here, each processor 202 and 204 operates in conjunction with its assigned memory 206 and 207, respectively, allowing simultaneously reading and writing of data. Therefore, each of the processors 206 and 207 is capable of independently calculating the ST and storing the resulting ST data into its respective memory substantially increasing overall computing performance.

Figure 6:
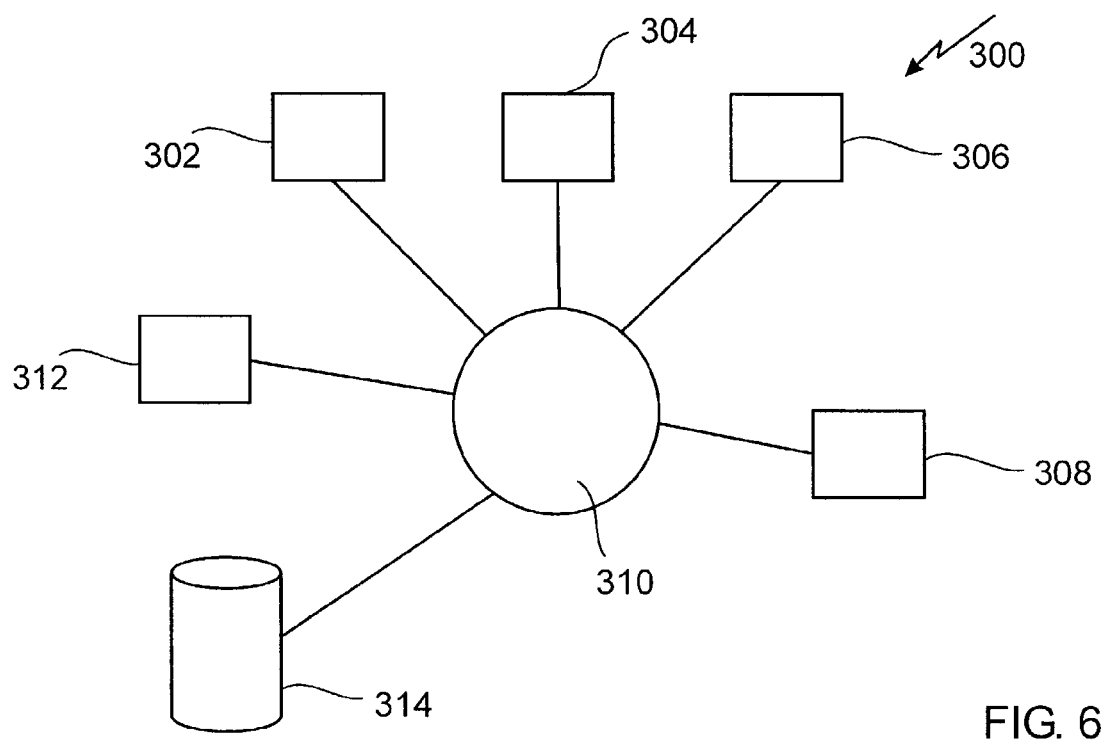
FIG. 6 is a simplified diagram illustrating yet another embodiment of a system for distributed computing an S transform dataset of multidimensional image data according to the invention.
Figure 7:
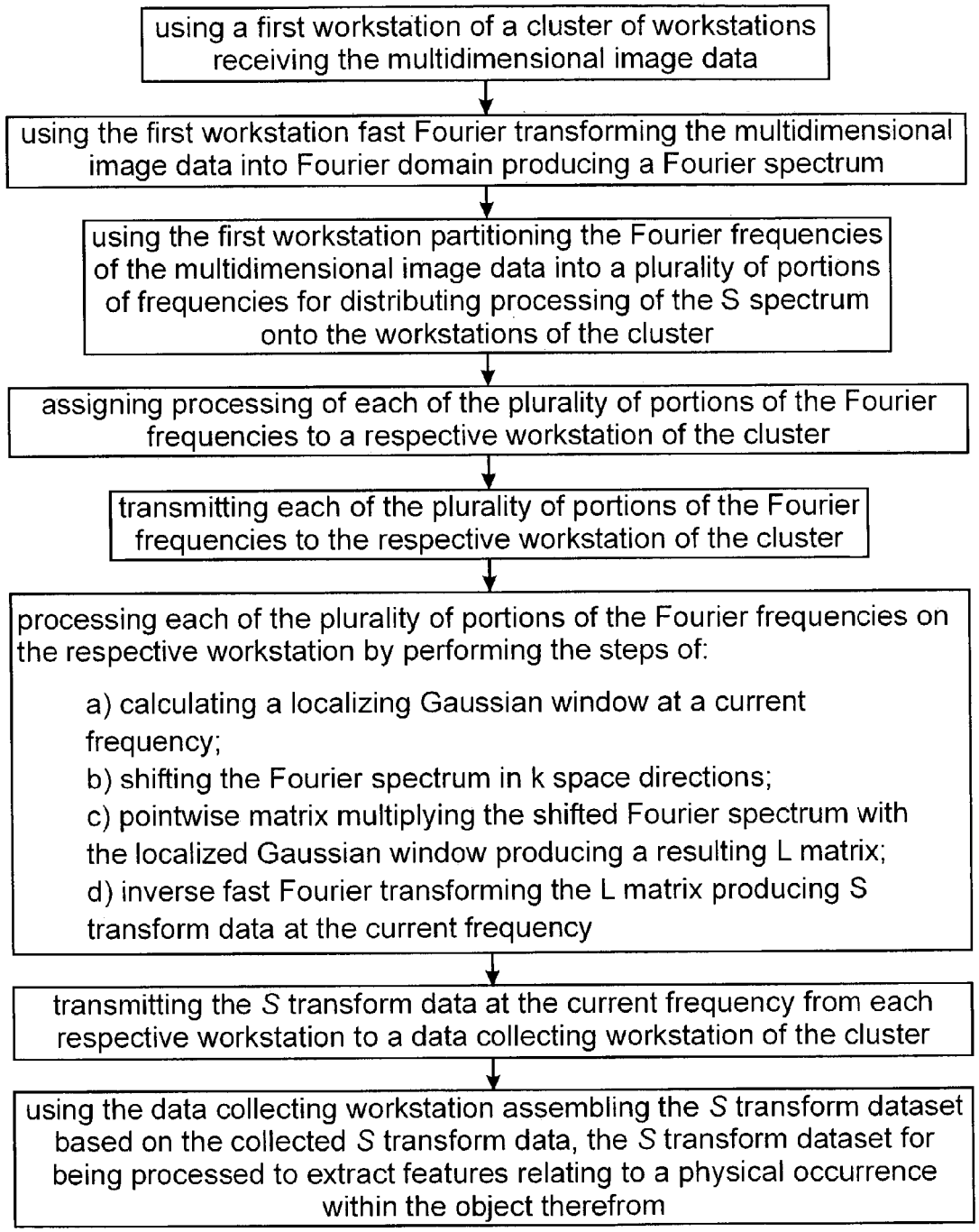
FIG. 7 is a flow diagram illustrating another embodiment of a method for distributed computing an S transform dataset of multidimensional image data according to the invention.
Figure 8:
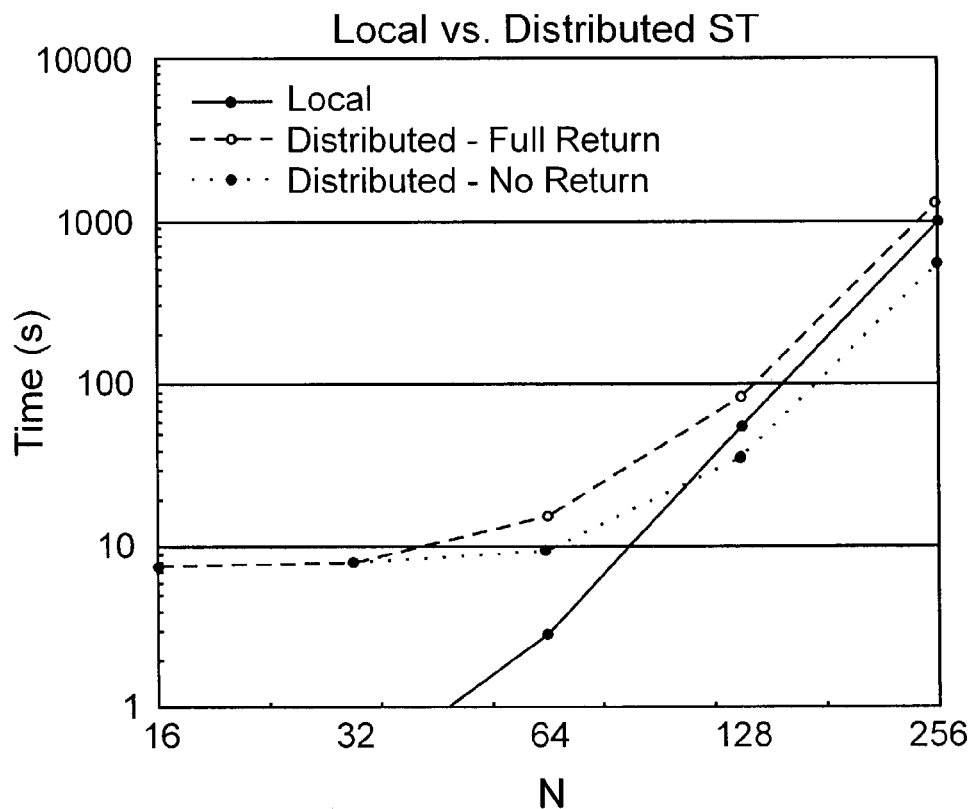
FIG. 8 is a diagram comparing the performance of a one processor system with a multiprocessor system.
Figure 9:
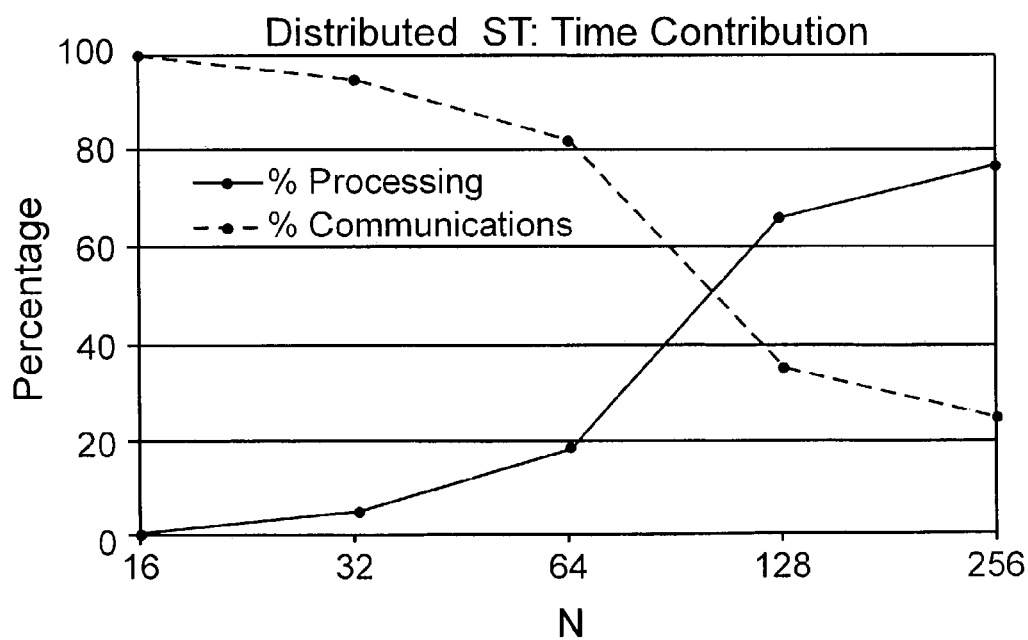
FIG. 9 is a diagram illustrating the contribution of communication and processing to the total computation time; and, FIG. 10 is a diagram illustrating distributed ST performance as a function of nodes.

Referring to FIGS. 6 and 7, another system 300 and method for ST processing according to the invention is shown. Here, the parallel computation is achieved using a plurality of computers 302, 304, 306, and 308, generally referred to as nodes. The computers 302, 304, 306, and 308 are connected by a network 310 forming a cluster. For example, multidimensional image data received from a MRI system 312 via the network 310 are distributed to the computers 302, 304, 306, and 308 for computing the ST using computer 308 as a master node. The results are then transmitted via the network 310 to the computer 308 where the data are collected to form a complete ST data set. Optionally, the results are collected using a central disk server 314. Each node 302, 304, 306, and 308 possesses its own memory, disks and at least one processor allowing more resources to be applied for ST computing. Further, each node has dedicated access to its RAM. However, communication issues arise as meaningful analysis of the ST likely requires results produced by the various nodes of the cluster to be assembled in one location. Since each $S(*, *, k_x, k_y)$ plane is calculated with no dependence on the other $S(*, *, k_x, k_y)$ planes it is possible to distribute the computation of the ST by assigning the computation for a range of $(k_x, k_y)$ values to a node. In order to increase cluster performance, nodes are added to the cluster. Distributed computation of the ST process has been performed using standard MPI communications protocols and portable C code. Apart from the Altivec FFT, which is easily replaced by a native function, it is possible to execute the distributed ST code on a wide range of platforms. Furthermore, it is possible to combine a variety of different architectures such as Mac and x86 computers in a cluster. This flexibility allows assembling of a powerful computer cluster using already present hardware. For example, available workstations in a lab or clinical setting are connected and configured to participate in cluster computation whenever they are idle. In FIG. 8 results obtained from distributed ST processing according to the invention using two identical Mac G4s running at 867 MHz. A 100 Mb/s non-dedicated Ethernet network connected the machines. As shown in FIG. 8, though the cluster is achieving nearly a factor of two increase in raw computation speed over a single processor implementation, the need to return the results to a single computer introduces problems. The distributed computation of the ST including the return of results is slightly slower than a single processor version. The relative contribution of communication and processing to total ST computation time is summarized in FIG. 9. The total communication necessary to perform a distributed ST is proportional to the total amount of memory required to store the ST data—$O(N^4)$. Further, there is some overhead to assign tasks to each node making the distributed ST computation slow for small image data sets. Using the simple distributed ST process above, a node completes one task, before starting another, i.e. each node completes all ST calculations assigned to it and then communicates the results to a master node. However, it is possible to communicate the result of one $(k_x, k_y)$ calculation after it is completed while simultaneously performing the next $(k_x, k_y)$ computation.

Combining calculation and communication increases overall performance of the cluster resulting in a performance closer to the "no return" results in FIG. 8.

A change in the network architecture also yields significant improvements. A factor of increase in performance is possible by replacing the 100 Mb/s Ethernet with a gigabit Ethernet. However, this improvement is constant and does not scale with the number of nodes. An optimization that does scale with the number of nodes is achieved by using a central disk server that does not participate in the processing but only collects the results from each node. Preferably, this server has both the external bandwidth in the form of Ethernet segments and internal bandwidth to its hard drives in order to receive data from many nodes at once. Segmented Ethernet is a mature technology, and such servers are widely available. For example, a high bandwidth server is created by simply adding multiple network interface cards to a computer. While the master node used in the above example is only able to handle full speed communication from one node at a time, a high bandwidth disk server's capacity is increased simply by increasing the number of Ethernet segments it has access to. This situation is analogous to the processing improvement a distributed cluster obtains from additional nodes.

Figure 10:
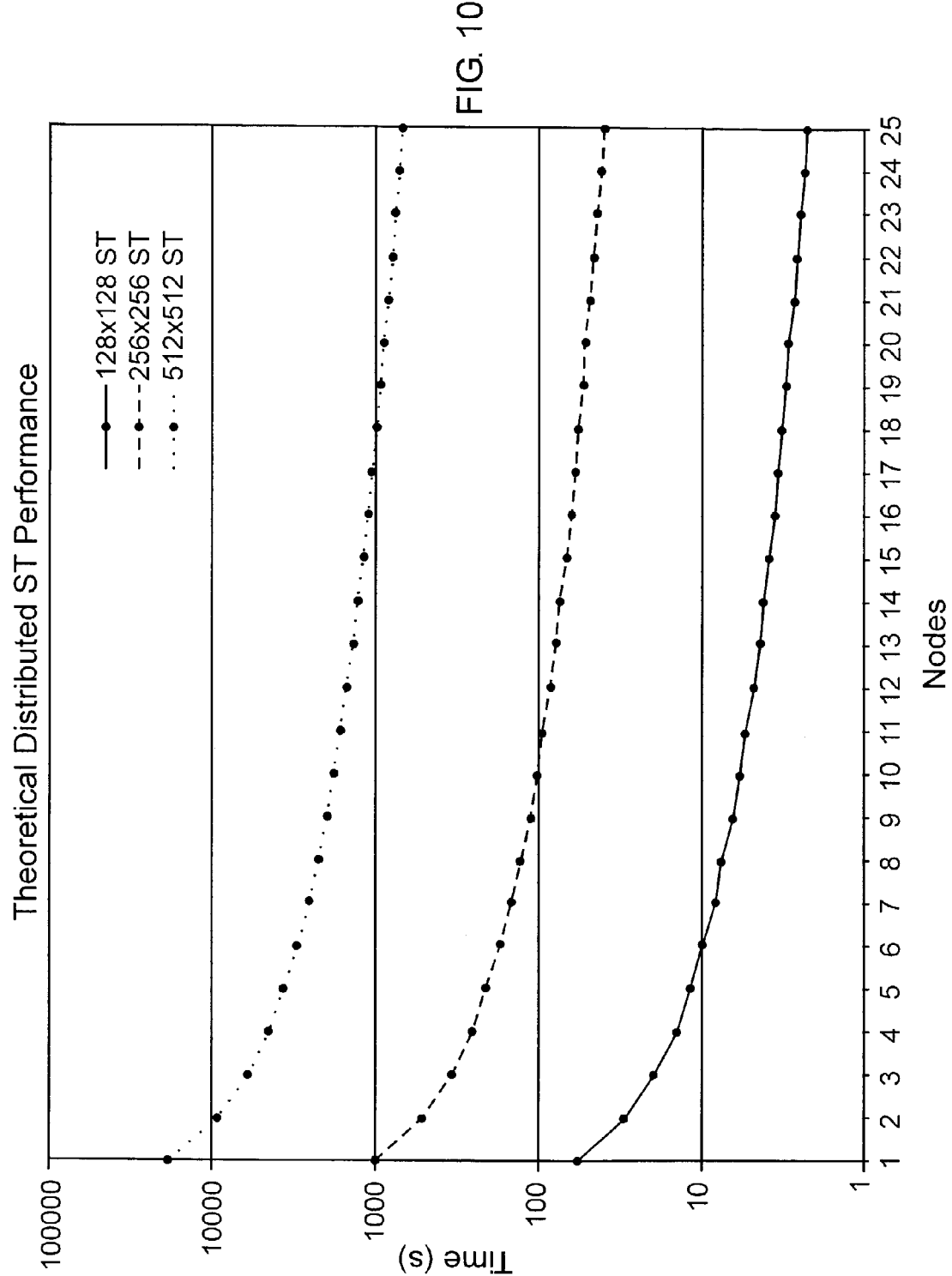

The strength of a distributed computing cluster using a segmented network and a disk server of appropriate bandwidth is easy scalability. FIG. 10 illustrates theoretical results of the performance of distributed ST computation for various cluster sizes, assuming a fully segmented gigabit Ethernet network with adequate server bandwidth for the number of nodes in use. For example using a 20 node cluster of Mac G4 867,the time needed to calculate and store the ST data for a 512×512 image is approximately 15 minutes compared to 36 hours needed using a single processor computer, thus allowing application of the S transform in a clinical setting.

Numerous other embodiments of the invention will be apparent to persons skilled in the art without departing from the spirit and scope of the invention as defined in the appended claims.

What is claimed is:

1. A method for computing an S transform dataset of multidimensional image data of an object comprising:
   receiving the multidimensional image data;
   fast Fourier transforming the multidimensional image data into Fourier domain producing a Fourier spectrum partitioning the Fourier frequencies of the multidimensional image data into a plurality of portions of frequencies for simultaneously processing the S spectrum corresponding to the portions of the Fourier frequencies;
   performing at each frequency of a plurality of frequencies of the Fourier spectrum:
   a) calculating a localizing Gaussian window at a current frequency;
   b) shifting the Fourier spectrum in k space directions;
   c) pointwise matrix multiplying the shifted Fourier spectrum with the localized Gaussian window producing a resulting L matrix;
   d) inverse fast Fourier transforming the L matrix producing the S transform at the current frequency; and,
   collecting the S transform at each frequency producing the S transform dataset.

2. A method for computing an S transform dataset of multidimensional image data of an object as defined in claim 1 wherein b) comprises the step of producing a plurality of copies of the Fourier spectrum, and wherein the Fourier spectrum is shifted by applying pointer operations to the plurality of copies of the Fourier spectrum.

3. A method for computing an S transform dataset of multidimensional image data of an object as defined in claim 2 wherein the plurality of copies of the Fourier spectrum is stored in a one-dimensional array and wherein the pointer operations are performed using strides.

4. A method for computing an S transform dataset of multidimensional image data of an object as defined in claim 2 comprising calculating and storing a set of vectors for use in generating a Gaussian window.

5. A method for computing an S transform dataset of multidimensional image data of an object as defined in claim 4 wherein in a) the Gaussian window is generated by combining vectors of the stored set of vectors.

6. A method for computing an S transform dataset of multidimensional image data of an object as defined in claim 1 wherein the portions of the Fourier frequencies are simultaneously processed by dividing a vector into a plurality of segments, each segment reflective of the S spectrum corresponding to the portion of the Fourier frequencies when processed.

7. A method for computing an S transform dataset of multidimensional image data of an object as defined in claim 6 wherein the portions of the Fourier frequencies are simultaneously processed using a parallel vector processor.

8. A method for computing an S transform dataset of multidimensional image data of an object as defined in claim 1 comprising:
   assigning processing of each of the plurality of portions of the Fourier frequencies of the multidimensional image data to a respective processor of a plurality of processors;
   transmitting the Fourier spectrum and each of the plurality of portions of the Fourier frequencies to the respective processor; and,
   processing each of the plurality of portions of the Fourier frequencies by performing a) to d) on the respective processor.

9. A method for computing an S transform dataset of multidimensional image data of an object as defined in claim 8 wherein some portions of the Fourier spectrum are simultaneously processed using a multiprocessor computer.

10. A method for computing an S transform dataset of multidimensional image data of an object as defined in claim 8 wherein the portions of the Fourier frequencies are simultaneously processed using a cluster of workstations, each workstation comprising at least a processor.

11. A method for distributed computing an S transform dataset of multidimensional image data of an object comprising:
    using a first processor of a cluster of processors receiving the multidimensional image data;
    using the first processor fast Fourier transforming the multidimensional image data into Fourier domain producing a Fourier spectrum;
    using the first processor partitioning the Fourier frequencies of the multidimensional image data into a plurality of portions of portions of frequencies for distributing processing of the Fourier spectrum onto the processors of the cluster;
    assigning processing of each of the plurality of portions of the Fourier frequencies to a respective processor of the cluster;
    transmitting the Fourier spectrum and each of the plurality of portions of the Fourier frequencies to the respective processor of the cluster;

processing each of the plurality of portions of the Fourier frequencies on the respective processor by performing:
a) calculating a localizing Gaussian window at a current frequency;
b) shifting the Fourier spectrum in k space directions;
c) pointwise matrix multiplying the shifted Fourier spectrum with the localized Gaussian window producing a resulting L matrix;
d) inverse fast Fourier transforming the L matrix producing S transform data at the current frequency;
transmitting the S transform data at the current frequency from each respective processor to a data collecting processor of the cluster;
using the data collecting processor assembling the S transform dataset based on the collected S transform data, the S transform dataset for being processed to extract features relating to a physical occurrence within the object therefrom.

12. A method for distributed computing an S transform dataset of multidimensional image data of an object as defined in claim 11 wherein the S transform data at a first frequency are transmitted while a) to d) are performed for calculating the S transform data at a second other frequency.

13. A method for distributed computing an S transform dataset of multidimensional image data of an object as defined in claim 12 wherein the data collecting processor is simultaneously receiving the S transform data from a plurality of processors.

14. A processing system for computing an S transform dataset of multidimensional image data of an object comprising:
a plurality of processors, each for performing at each frequency of a respective portion of the Fourier spectrum of the multidimensional image data:
a) calculating a localizing Gaussian window at a current frequency;
b) shifting the Fourier spectrum in k space directions;
c) pointwise matrix multiplying the shifted Fourier spectrum with the localized Gaussian window producing a resulting L matrix;
d) inverse fast Fourier transforming the L matrix producing S transform data at the current frequency;
at least a memory for data storage;
a display for displaying a multidimensional image of the object, the image being based upon the S transform data; and,
a communication link connecting the at least a processor, the at least a memory, and the display for providing data communication therebetween.

15. A processing system for computing an S transform dataset of multidimensional image data of an object as defined in claim 14 wherein the plurality of processors share the at least a memory.

16. A processing system for computing an S transform dataset of multidimensional image data of an object as defined in claim 14 wherein the at least a memory is a plurality of memories and wherein each processor has unrestricted access to a respective memory.

17. A processing system for computing an S transform dataset of multidimensional image data of an object as defined in claim 16 wherein each of the plurality of processors and the respective memory form a workstation and wherein the communication link is a computer network.

18. A processing system for computing an S transform dataset of multidimensional image data of an object as defined in claim 17 wherein the plurality of workstations comprised different computer architectures.

19. A processing system for computing an S transform dataset of multidimensional image data of an object as defined in claim 17 wherein a designated workstation of the plurality of workstations forms a master node for organizing the distributed processing.

20. A processing system for computing an S transform dataset of multidimensional image data of an object as defined in claim 19 wherein the master node is a data collecting node for collecting and storing the S transform data.

21. A processing system for computing an S transform dataset of multidimensional image data of an object as defined in claim 19 comprising a central disk server for collecting and storing the S transform data.

22. A processing system for computing an S transform dataset of multidimensional image data of an object as defined in claim 21 wherein the central disk server is a high bandwidth server.

23. A processing system for computing an S transform dataset of multidimensional image data of an object as defined in claim 22 wherein the computer network is a segmented high bandwidth network.

24. A processing system for computing an S transform dataset of multidimensional image data of an object as defined in claim 23 wherein the computer network is a gigabit Ethernet.

25. A processing system for computing an S transform dataset of multidimensional image data of an object as defined in claim 23 wherein the central disk server has external bandwidth in the form of network segments and internal bandwidth to hard drives.

26. A processing system for computing an S transform dataset of multidimensional image data of an object as defined in claim 25 wherein the central disk server is capable of simultaneously receiving the S transform data from the plurality of workstations.

* * * * *